H. A. HUMPHREY AND W. J. RUSDELL.
APPARATUS FOR PUMPING FLUID.
APPLICATION FILED DEC. 2, 1915.
1,309,943.
Patented July 15, 1919.
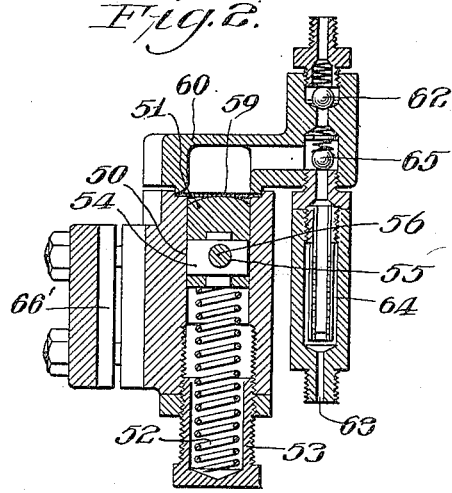
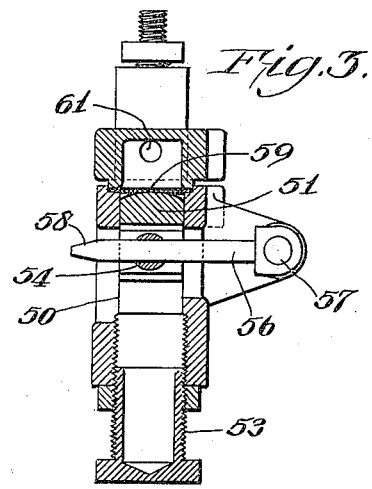
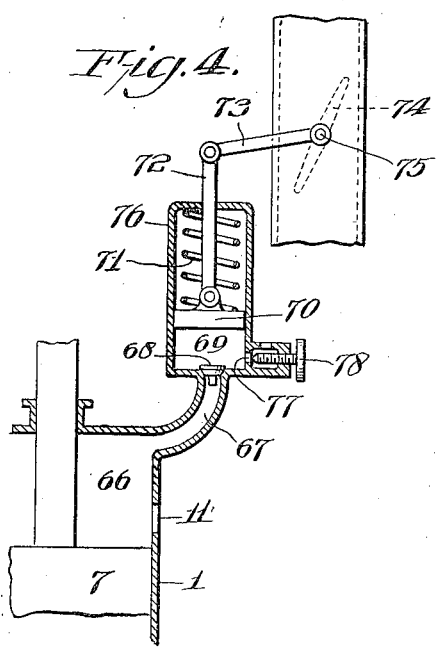
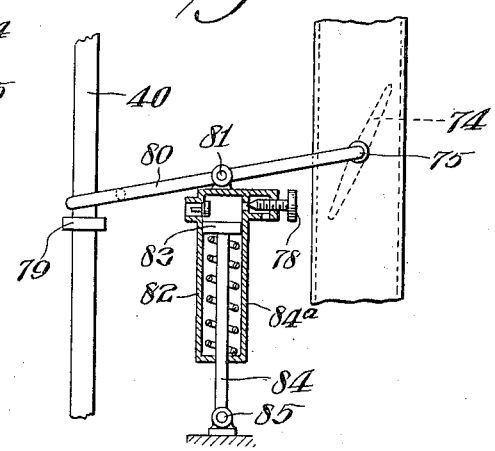

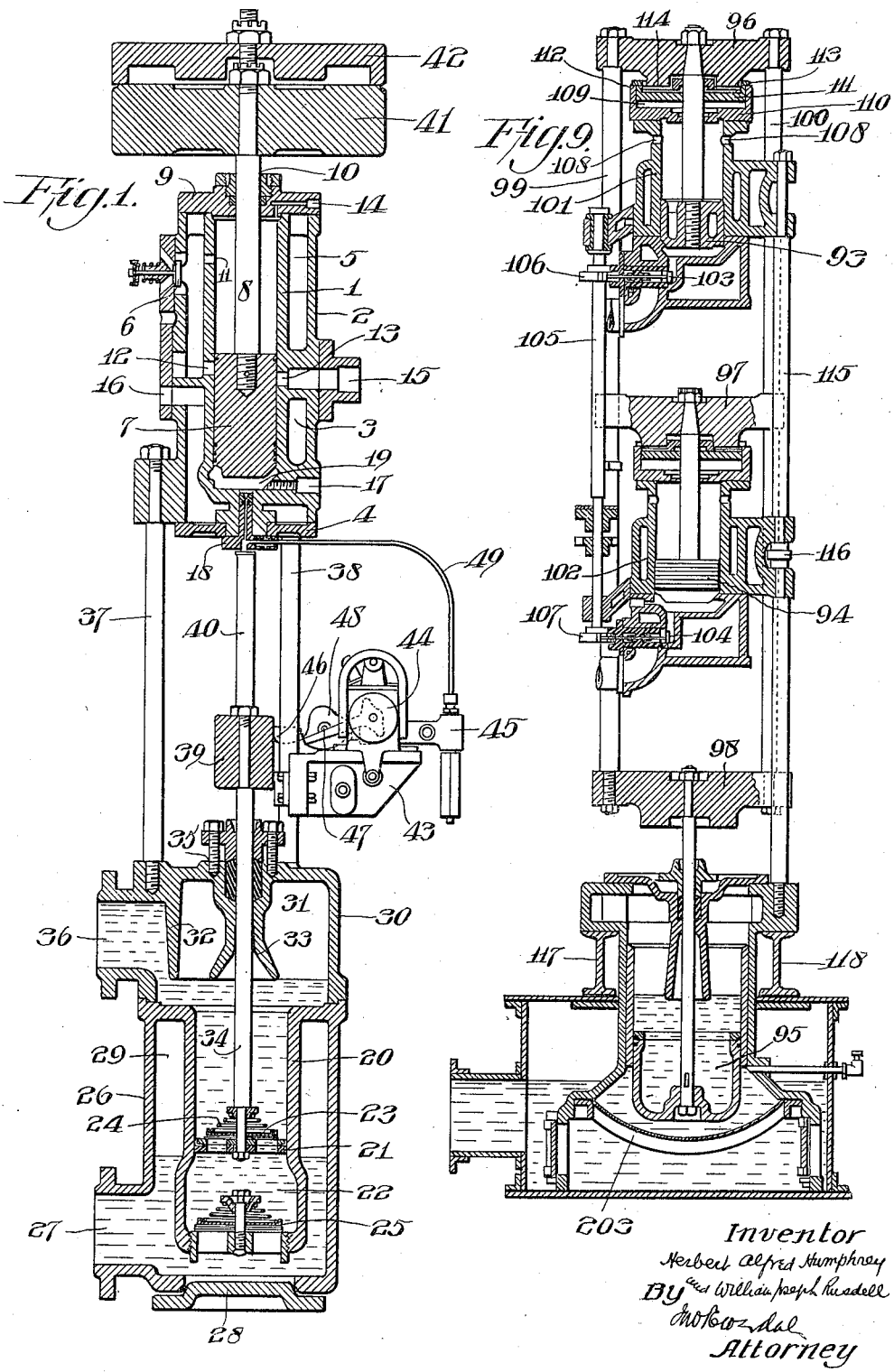

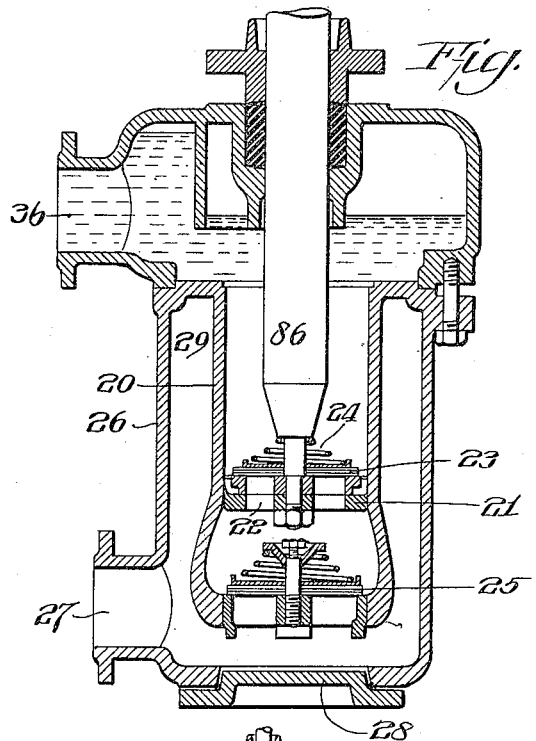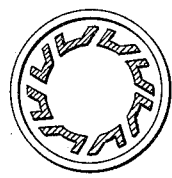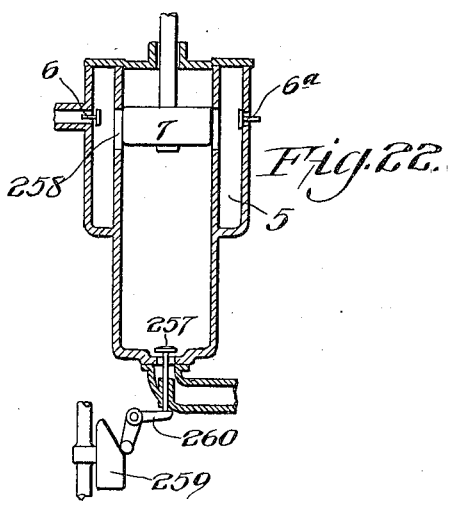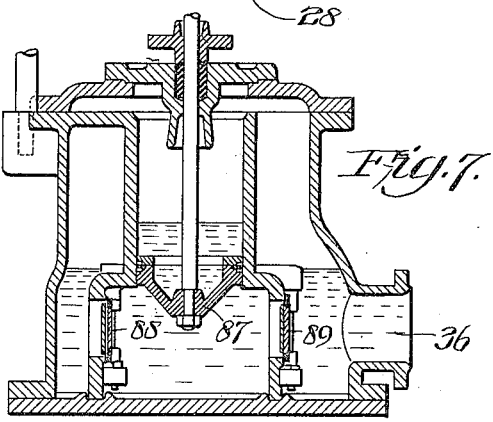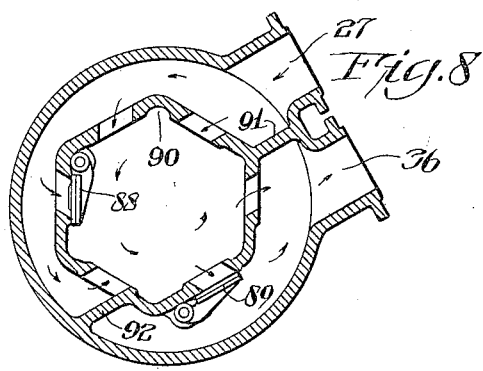

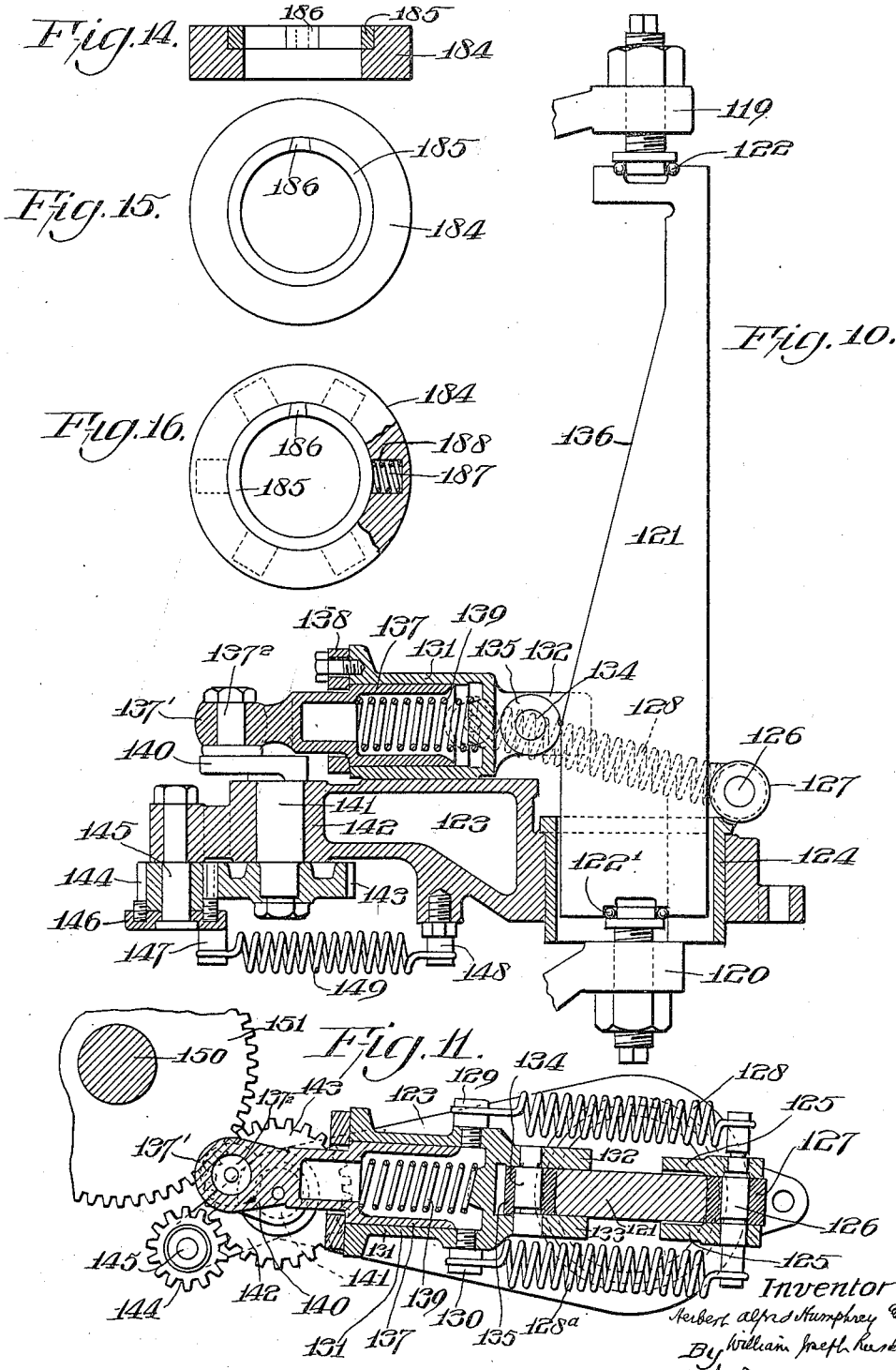

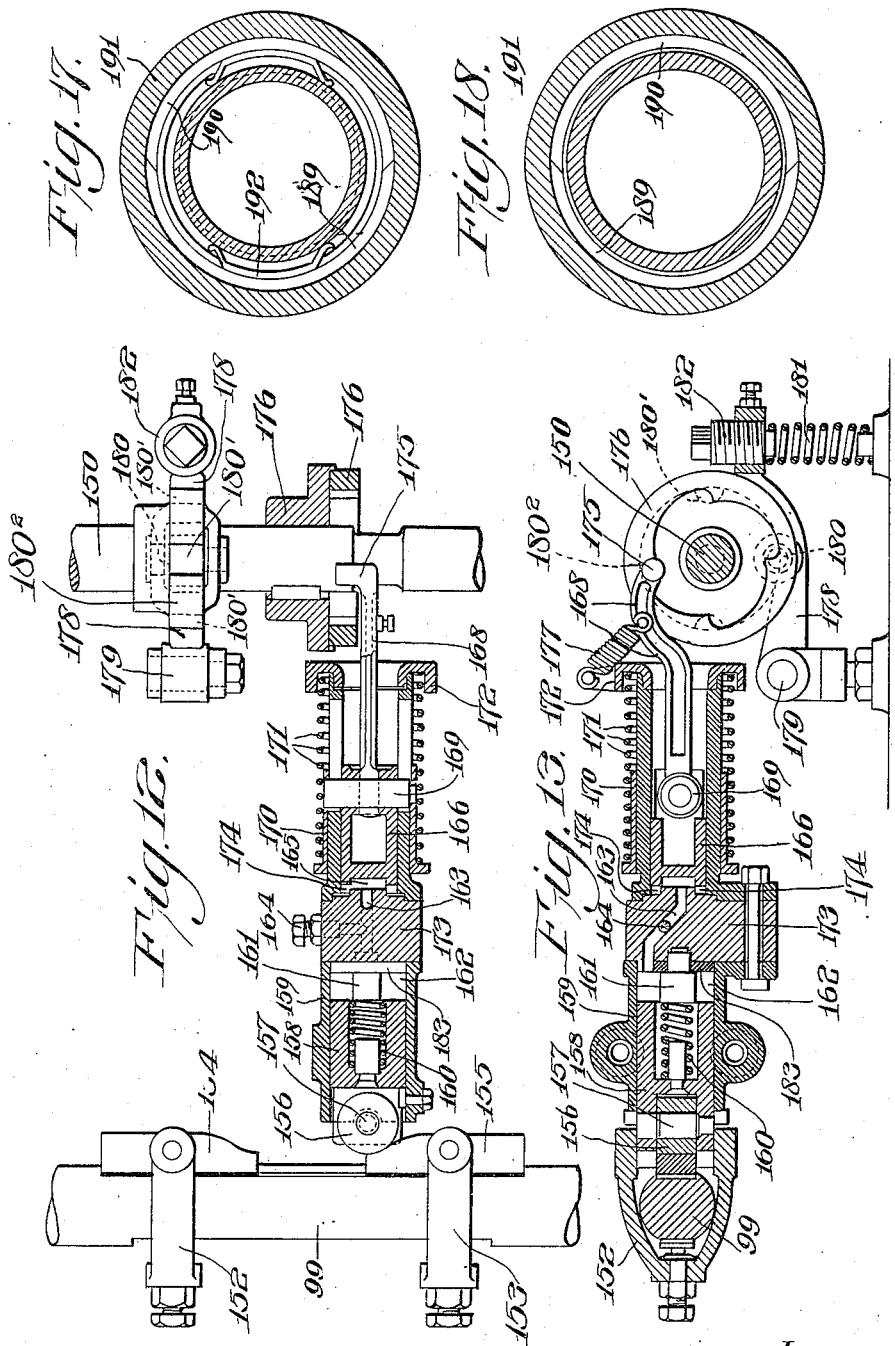

UNITED STATES PATENT OFFICE.

HERBERT ALFRED HUMPHREY, OF LONDON, AND WILLIAM JOSEPH RUSDELL, OF WOLVERHAMPTON, ENGLAND, ASSIGNORS TO HUMPHREY GAS PUMP COMPANY, A CORPORATION OF NEW YORK.

APPARATUS FOR PUMPING FLUID.

1,309,943.  Specification of Letters Patent.  Patented July 15, 1919.

Application filed December 2, 1915. Serial No. 64,724.

*To all whom it may concern:*

Be it known that we, HERBERT ALFRED HUMPHREY, a subject of the King of Great Britain, residing in London, England, and WILLIAM JOSEPH RUSDELL, a subject of the King of Great Britain, residing in Wolverhampton, Staffordshire, England, have invented a new and useful Improvement in Apparatus for Pumping Fluid, of which the following is a specification.

Our invention relates to improvements in the apparatus for pumping fluid.

In our copending application Serial No. 696,639 filed May 11, 1912, we have described the method of utilizing an expansive force to raise or force liquids or compress elastic fluids and apparatus therefor wherein a fluid mass or linked solid masses, capable of solid mass or linked solid masses, capable of acquiring momentum sufficient to limit the velocity of the liquid or gases through the valves to that required in practice, reciprocate continuously and freely without control otherwise than by work done or energy stored or both at each stroke, the momentum aiding the compression of the expansible charge or a constituent thereof to the desired pressure in an expansion or power chamber by an inward stroke of the reciprocating masses toward such chamber.

In connection with such apparatus there have been described means whereby energy is stored during each stroke, such as by compressing elastic cushions or raising weights for the purpose of effecting or assisting the next stroke. In accordance with our present invention, in which a compressed combustible mixture is used merely as an example of an expansible charge, we use one or more separate cushions other than that constituted by the expansible charge or constituent thereof in such a manner that the said cushions are not compressed on each stroke when the apparatus is working normally but only come into operation when starting the apparatus from rest, or on decreased external work resistance or when greater energy is generated on combustion, or when for any other reasons the length of the stroke increases. We have found that by normally keeping such cushions out of action and only allowing them to come into operation, that is, to be compressed, in order to control the length of stroke within the desired limits and for purposes of controlling the pump generally, we are able to obtain a higher efficiency due to the elimination of losses which inevitably occur when such cushions are considerably compressed at each stroke, and to construct an apparatus of increased efficiency and utility. Further, we are enabled to provide a pump or compressor of the vertical type in which the whole of the energy for a return stroke is furnished by the energy stored in the lifting of the solid masses which reciprocate, and which by falling under the action of gravity compress a fresh combustible charge. This compression of a fresh charge may take place without doing any other work, if one neglects the work in overcoming friction, and from this certain conditions arise. For example, the length of an upstroke may determine the volume of combustible mixture taken into the apparatus, and the following downstroke which results from the falling of the masses under the action of gravity will result in compressing the combustible mixture to a given pressure, thereby storing in the compressed mixture the energy due to the masses falling through a given distance. The volume of the combustible charge and the energy for compressing the charge are therefore both dependent upon the length of the strokes, and may bear an approximately constant ratio to one another, which means in other words that the degree of compression may be nearly independent of the length of the stroke. This is a very desirable condition and results in a nearly constant degree of compression. It is possible and preferable to arrange that all the work of pumping both on the suction and delivery side is done on the upstroke only and the above remarks in general apply to such a pump. The different pumps shown in the drawings are arranged to operate in this manner.

An apparatus may be constructed in accordance with our invention in which the power unit or units are adapted to work on any of the known cycles of internal combustion engines and to operate with gaseous or liquid fuel. The simplest combination is that in which the power unit has one 2-cycle combustion chamber, the piston of which is rigidly connected to the piston of a pump for liquids or gases. Where 4-cycle power units are employed it is generally advisable to have two units combined and operating alternately so that each outstroke becomes a power stroke, and it is obvious that any number of power units may be combined with any number of pump units, and that connections between them may be of the rigid or linked type.

Referring to the drawings, which illustrate merely by way of example, suitable means for the embodiment of our invention—

Figure 1 is a vertical section of pump of vertical type, having one two-cycle power unit connected to one pumping unit.

Fig. 2 is a vertical section of a modified form of liquid fuel pump.

Fig. 3 is a transverse section thereof.

Fig. 4 is a diagrammatic view of one means for controlling the amount of combustible constituents supplied to each stroke.

Fig. 5 is a similar view of another means for control.

Fig. 6 is a vertical section of a pump unit in which there is a differential arrangement of piston bucket and plunger, such as permits a large valve area and wider passage for liquids.

Fig. 7 is a similar section, illustrating a valve passage of greater area than in Fig. 6.

Fig. 8 is a sectional plan thereof.

Fig. 9 is a vertical section of an arrangement of pump applicable to a four-cycle type.

Fig. 10 is a vertical section of a suitable movement to operate valves of the power units.

Fig. 11 is a sectional plan thereof.

Fig. 12 is a vertical section of a pneumatically operated gear system for the transfusion of power to moving parts shown in Fig. 9.

Fig. 13 is a sectional plan thereof.

Fig. 14 is a sectional plan of an improved form of packing for airtight glands illustrated in Figs. 1 and 9.

Fig. 15 is a plan thereof.

Fig. 16 is a plan view partly in section, of a device for similar purpose.

Fig. 17 is a sectional plan of a packing ring for the piston operating in the combustion cylinder.

Fig. 18 is a similar section of a modification of packing ring also for piston operating in the combustion cylinder.

Fig. 21 is a sectional plan, diagrammatically illustrated, of a combustion chamber of a two-cycle engine.

Fig. 22 is a vertical section of the same.

Similar numerals refer to similar parts throughout the several views.

Figure 19:
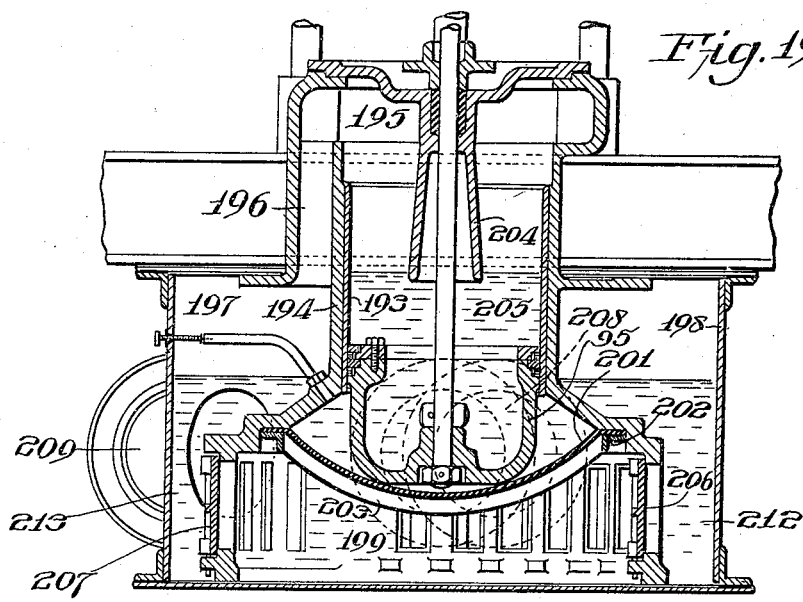
Fig. 19 is a sectional elevation on an enlarged scale of the lower portion of the pump unit shown in Fig. 9.

Fig. 1 shows a section of a vertical pump for liquids having one 2-cycle power unit connected to one pumping unit, and it will be first described as adapted for use with liquid fuel. The combustion cylinder 1 is inclosed in a jacket 2 and the lower part 3 of the annular space between them forms a water jacket closed by the cover 4, and the upper part 5 forms a chamber into which air is admitted through an inlet valve 6. 7 is a working piston with its rod 8 passing through a top cylinder cover 9 fitted with a gas-tight gland 10. In the cylinder wall there are ports 11, 12 and 13 which may be called the inlet, transfer and exhaust ports respectively. Passage 14 is for supplying lubricating oil, 15 is the outlet for exhaust gases, 16 the outlet for cooling water. The position of the inlet for the cooling water is not shown but this is situated at the lower end of the water jacket. 17 is a tapped hole into which an ignition plug can be screwed, and 18 is a liquid fuel sprayer. The piston 7 is shown at the working lower limit of its down-stroke leaving a compression space 19 between the piston and the end of the cylinder.

Passing to the pump unit, there is a pump cylinder 20 in which reciprocates the bucket piston 21 having ports 22 controlled by valve 23 loaded by spring 24. 25 is the suction or foot valve which may be likewise spring loaded, and which is fixed in the bottom of the casting 20. The outer part 26 of the casting carries the inlet for liquid 27 and a manhole cover 28 which gives access to the valve 25. The space 29 between the inner wall 20 and outer wall 26 of the casting forms a large air vessel on the suction side of the pump. Above the pump cylinder is fitted a casting 30 in which the space 31 provides an air cushion on the delivery side, the retention of the air in which is facilitated by the downwardly projected lip 32, and by the conical part 33 which surrounds the bucket rod 34 below the packed gland 35. 36 is the outlet for the liquid pumped.

Rigidly connecting the power unit with the pump unit in the manner shown are three columns two of which (37 and 38) only are shown in the figure. 39 is a cross-head rigidly connecting the pump rod 34 with two rods 40, one only of which is shown in the figure, which rods pass outside the power unit and are connected at two points with the weight 41 which in its turn is rigidly connected to the piston rod 8. In order that the weight of the reciprocating masses may be varied there is shown an additional weight 42 bolted to weight 41, and it will be understood that further weights can be added, or the total weight may be reduced by taking off weights. Attached to the fixed column 38 there is a bracket 43 carrying a magneto ignition machine 44; this bracket also carries a liquid fuel pump, the valve chamber 45 of which is seen in the figure. Attached to a reciprocating part such as crosshead 39 or rod 40 is a pawl 46 which engages with the armature lever 47 of the magneto and displaces it against the action of strong springs, this lever is released from the pawl 46 before the reciprocating parts arrive at the end of the downward stroke and the springs then revolve the armature of the magneto causing a spark in the combustion cylinder in the usual manner. The pawl 46 is so constructed that it does not displace the lever 47 on the up stroke. A striker (not shown) fixed to the crosshead 39 at about the level of the pawl 46, toward the latter end of the downstroke of the crosshead 39, engages the cam 48 which actuates the liquid fuel pump and discharges fuel pumped through pipe 49 to feed the liquid fuel spray 18. The liquid fuel pump is of a known type and it is not considered necessary to describe its parts in further detail, except to say that the cam which operates a small plunger in the pump may after deflection of the striker be returned to its normal position by means of a spring.

The action of the apparatus may now be described as follows:—

Commencing with a compressed combustible charge in the clearance space 19 ignition of this charge occurs and due to the expansion of the ignited gases an upward working stroke is made by the whole of the reciprocating masses which are rigidly connected together. The space above piston 7 in cylinder 1 contains air which has been drawn in through port 11 and valve 6 on the previous downstroke, and as valve 6 was shut by its spring at the end of the said downstroke, the air above piston 7 is now compressed on the upstroke and causes the pressure in space 5 to rise as air is forced backward through port 11 into this space. The bottom of piston 7 in rising first uncovers the exhaust port 13 so that burnt products escape through the outlet 15, and the pressure in the combustion chamber is lowered, then the transfer port 12 is uncovered and air under pressure contained in space 5 at once flows through port 12 displacing burnt products and filling the combustion chamber with fresh air. By properly shaping the end of the piston at that part which comes opposite the transference port 12 the air passing through this port can be so deflected downward into the chamber that the air scavenges out most of the burnt products remaining. The normal upward working stroke of the reciprocating masses ends when the top edge of the piston 7 is approximately level with the upper edge of ports 11, and any further upward movement which may occur will compress the air cushion above the piston which is retained owing to the piston covering port 11.

Passing to the pump unit, the upward working stroke lifts the pump bucket 21 and the valve 23 being closed liquid is delivered through outlet 36 against the head or pressure existing therein, and fresh liquid is taken in through inlet 27, the valve 25 lifting to allow the passage of this liquid as the bucket piston 21 moves upward. Both the suction air vessel 29 and the delivery air vessel 31 are arranged in very close proximity to the suction valve and the delivery valve respectively and these air vessels are also of large size. This greatly facilitates the smooth working of the pump and allows of higher speed of pumping.

During the downstroke of the reciprocating masses which takes place under the action of gravity, there occurs an intake of fresh air above piston 7 through valve 6 and port 11 since the transfer port 12 is the first to be closed, and this intake continues until completion of the downstroke. Below piston 7 immediately after the exhaust port 13 is covered by the piston, the air now inclosed and in the combustion chamber suffers compression and thereby absorbs the energy given out by the falling of the reciprocating masses. Toward the end of the stroke but before the downward stroke is completed the striker already referred to has operated the liquid fuel pump and a finely atomized liquid fuel spray is injected into the compressed air through any suitable sprayer of known type thus forming in the clearance space 19 a fresh combustible charge which is ignited as soon as magneto lever 47 is tripped, such ignition starting a fresh cycle of operations. In the pump unit no work is done during the downward stroke, but liquid which was below bucket piston 21 passes through the valve 23 to the top side of the piston, valve 25 being held shut by its spring during this part of the operation. The fact that there is only frictional resistance to be overcome in the pump unit during the downward stroke enables practically the whole of the energy given out by the falling masses to be stored in the compression of the fresh combustible charge.

Should the pump be started from rest, it may happen that neither the suction pipe connecting with inlet 27 nor the delivery pipe connecting with outlet 36 are primed with liquid, and in this case the work resistance of the pump will be less than the normal resistance, and, therefore, there may be surplus energy developed in the combustion chamber which in turn will result in a longer stroke. In such case the top of piston 7 will completely cover the inlet port 11 and the further upward travel of the piston will compress the air contained above piston 7 in the top of cylinder 1. The energy then stored in the compression will bring the reciprocating masses to rest and will assist the weights in commencing the next downward stroke. The effect is that the compression of the combustible charge is carried out to a higher pressure on the following downstroke and there would be still more energy available for the next upward stroke. Means to be described are therefore provided to lessen the energy of combustion and thus to check any tendency of the pump to unduly increase its speed. We have proved in actual practice that a pump may be permitted to increase its speed considerably when starting from rest and while the work resistance of the pump is being built up during the filling of the suction and delivery pipes with liquid, and this without harm to the apparatus.

Should the energy of combustion increase due to the increase in the heat units supplied in the fuel or should the external work resistance decrease due to the pump delivering to a lower head or for any other reason then the piston will move higher and the surplus energy will be stored in the compression of the elastic cushion above port 11. This stored energy may have the effect of increasing the speed of working. The working of the apparatus may then be controlled according to the degree of compression of the cushion so that the higher the compression the less will be the amount of combustible fuel allowed to pass into the combustion chamber.

So far the apparatus has been described as adapted for use with liquid fuel, but it will also operate when supplied with gaseous fuel. To explain this it will be sufficient to suppose that instead of air being admitted at inlet valve 6 gaseous combustible mixture is admitted through the said valve and the liquid fuel pump itself disconnected. On an upstroke there will then be combustible mixture above piston 7 and some of this mixture will be transferred through port 12 to the combustion chamber to be therein compressed by the next downstroke of piston 7 and to be ignited to start the next cycle. In practice there would be an additional gas inlet valve to regulate the mixture which is drawn in past valve 6, or there may be a separate mixture tank fitted with suitable non-return valves for gas and air.

The last arrangement described is also suitable for liquid fuel; for instance an ordinary carbureter could be connected to the inlet valve 6 so that the downward stroke of piston 7 draws carbureted air past the valve 6. When combustible mixture is drawn past valve 6 it is sometimes desirable to dispense with the exhaust port 13, and to provide a mechanically operated exhaust valve at the bottom end of the combustion cylinder approximately at the point where the sprayer 18 enters the combustion cylinder, see Fig. 20 described later.

In the above description the liquid fuel pump has been referred to as a pump of known type operated by a pawl 46 and a cam 48, but we have found that a still simpler arrangement shown in Figs. 2 and 3 will answer the purpose since the quantity of liquid fuel required for each working stroke is small and it is advantageous that it should be injected into the combustion chamber suddenly and under considerable pressure so that the atomizing of the liquid may be as perfect as possible. In a cylinder 50 there slides a piston 51 pressed upward by a spring 52 the tension of which can be adjusted by means of the screw cap 53. Passing through the piston there is a pin 54 which can rotate freely and which is pierced by a hole 55 through which passes a trip lever 56 pivoted at 57. The end 58 of the trip lever 56 is adapted to engage with the pawl 46 of Fig. 1 during the downward stroke of the main apparatus, and this engagement causes the lever 56 to be rotated, thus carrying the piston 51 downward and compressing the spring 52 until lever 56 becomes disengaged. The piston is then free to rise quickly under the action of spring 52 until it reaches a diaphragm 59 the edges of which are clamped between the cylinder cover 60 and the cylinder 50. The blow thus struck by the piston causes a deflection of the diaphragm and as the space in the cylinder cover and the passage 61 is filled with liquid fuel, the upward deflection of the diaphragm 59 causes liquid fuel to pass a spring loaded ball valve 62 and thus to be forced to the liquid sprayer 18 of Fig. 1, and to be supplied to the combustion chamber. The diaphragm is here shown as a simple metal disk, but it may be a corrugated metal disk, or it may be formed partly of metal and partly of flexible material, but it is desirable that the resilience of the diaphragm shall be such that after deflection it will recover its position and so draw in a fresh supply of oil through inlet 63 past the filter 64 and a spring loaded ball valve 65. A clamp 66' is provided to fasten the pump to a stationary column such as 38 in Fig. 1. The amount of liquid fuel supplied is determined by the degree of flexibility of the diaphragm 59, by the tension of spring 52, and by the extent of the motion of lever 56 while in contact with the pawl 46 of Fig. 1, and one or more of these factors can be altered either by hand or by a governing device as desired in order to control the working.

In connection with Fig. 1 reference has been made to a means of controlling the amount of combustible constituents supplied at each stroke with the object of reducing the amount should the stroke tend to increase in length. Fig. 4 illustrates diagrammatically one simple means of effecting the desired result. The diagram shows a part of combustion chamber 1 and of piston 7, also inlet port 11 the function of which has been explained in connection with Fig. 1. The air or combustible mixture in the cushion space 66 will suffer compression after piston 7 covers port 11 in an upward stroke. Should such compression take place some of the gaseous content of the cushion 66 will be forced through passages 67 and past valve 68 into the space 69 beneath piston 70 and will lift this piston against the pressure spring 71 thus moving links 72 and 73 and rotating the throttle valve 74 about the fixed pivot 75, the result being to throttle the motion of combustible constituent either gaseous or liquid and thus reduce the quantity delivered to the combustion chamber for the next working stroke. Toward the lower part of cylinder 76 there is fitted a passage way 77 controlled by a needle valve 78 which permits some escape of the contents from the space 69 into the atmosphere, the amount depending upon the adjustment of valve 78. This leakage into the atmosphere permits piston 70 to recover its position under the action of spring 71 and thus to again open the throttle valve 74, such action will take place more slowly if the aperture 77 is further restricted. The adjustment of the valve 78 further provides a means of regulating the movement of the throttle valve 74 and so controlling the supply of combustible constituent, and consequently of regulating the length of the stroke. By this means the length of the stroke may be kept within desired limits.

Fig. 5 shows diagrammatically a similar device but in this case operated by some portion of the main apparatus which reciprocates, such for example as rod 40 of Fig. 1. Fixed to rod 40 there is a collar 79 adapted to engage the end of a lever 80 which in turn is fixed to throttle valve 74 pivoted at 75. Rod 80 is pivotally connected at 81 with a cylinder 82 in which moves a piston 83 connected by a rod 84 with a fixed pivot 85. The needle valve 78 of similar construction to that last described and serving a similar purpose is attached near the top of cylinder 82. The apparatus acts as follows:—If the length of stroke of the part 40 increases beyond a predetermined length, the collar 79 engages the lever 80 and rotates the throttle valve 74 thus cutting off part of the supply of the combustible constituent to the main apparatus. Cylinder 82 is lifted relatively to the piston 83 and a spring 84ª is compressed thus tending to draw down cylinder 82 and rod 80, and to again open the throttle valve 74. The extent and rapidity of this movement will depend upon the extent of opening of aperture of the needle valve, and the device will act as a dashpot in controlling the movements of valve 74 in a manner which will depend on the setting of the valve 78. In the event of the length of the stroke of the combustion piston decreasing the cylinder 82 will slowly fall gradually opening the throttle valve 74 and thus supplying more combustible constituents to the combustion cylinder to increase the power developed therein.

Fig. 6 shows a pump unit in which there is a differential arrangement of piston bucket and plunger such as permits a larger valve area and wider passages for the liquid to be employed. The cylinder casting 20 and 26 and the valves 23 and 25 may be compared with the parts similarly numbered in Fig. 1, but whereas the bucket rod 34 in that figure was comparatively small in Fig. 6 it is increased in size to the area of plunger 86, the bottom of which, where it joins the bucket piston, being reduced in diameter so as to give ample way for the fluid passing valve 23. The amount of liquid pumped on an upstroke is due to the difference in displacement of the bucket piston 21 and the plunger 86. Therefore 21 may be made larger in diameter as 86 is increased in size without increasing the displacement. This arrangement which enables the bucket piston to be increased in size also enables the valve 23 to be likewise made larger so that the velocity of the liquid passing the valve when the pump works at a greater number of strokes per minute may not exceed the permissible velocity which is reached in the case of Fig. 1 with a lesser number of strokes per minute or a lesser speed of the bucket. Further, the capacities of the air vessels in contact with the suction 27 and the delivery 36 are likewise made of greater capacity relatively compared to Fig. 1, and this also assists rapid working.

Still greater valve area for the passage of liquid can be obtained by the arrangement shown in Fig. 7 and Fig. 8 where the plain piston 87 is used instead of the bucket piston and valve, and where suction and delivery valves of the hinge type such as 88 and 89 respectively are arranged in the walls of a valve box 90. In this case the inlet is at 27, the delivery at 36, and the partition walls 91 and 92 separate the delivery and suction both as regards the space for liquid and the space for air. The suction and delivery air vessels are immediately over their respective valves and the lines of the flow of liquid through the suction passage, suction valves, valve box and out through the delivery valves and delivery passage are good.

The apparatus as above described is of a type suitable for operating on a 2-stroke cycle, but in Fig. 9 an arrangement suitable for operating on a 4-stroke cycle is shown. To obtain a working stroke on every upward stroke of the reciprocating masses two power units are employed and they are so arranged that ignition occurs alternately in each of them. The two power pistons 93 and 94 and the pump piston 95 are connected by their rods with the cross heads 96, 97 and 98 respectively and these crossheads are all rigidly connected together by the outside rods 99 and 100 so that the whole of the masses reciprocate together. In the bottom of the combustion cylinders 101 and 102 there are fitted the usual inlet and exhaust valves one of which, such as 103 in one cylinder or 104 in the other cylinder, only is shown. In the present case these valves are shown operated by means of a revolving cam shaft 105 carrying cams 106 and 107 for the two power units respectively. Since both the power units are alike it will be sufficient to describe the construction of one of them. As shown they differ from the ordinary 4-cycle gas engine unit in that there are ports 108 connecting between the inside of cylinder 101 and the atmosphere and situated at a point in the cylinder walls so that on a normal stroke these ports are only just covered when piston 93 reaches the limit of its upward stroke. Should the stroke increase ports 108 are covered by the piston and an elastic cushion is compressed in the top of cylinder 101 above piston 93. The function of this cushion is similar to that contained above the piston 7 of Fig. 1 when port 11 is covered by the piston and need not be again described. In case of any failure of any of the admission or exhaust valves such as valve 103 or 104 to act properly and in order to prevent under such circumstances the downward stroke of the pistons from exceeding the desired limits additional cushions are provided in the spaces, such as 109, between the cylinder cover 110 and a further piston 111 which slides in a short cylinder 112, and is normally held up at the top of the cylinder against the stop 113 by means of springs not shown. In normal working this cushion does not come into action, but should the length of the downward stroke increase a projecting ring 114 on the cross head 96 is adapted to engage the piston 111 compressing the cushion in space 109, and thus storing energy which brings the moving masses to rest and prevents the length of the stroke increasing to a harmful extent. A soft or resilient material such as a leather or rubber ring may be inserted between the surfaces 114 and 111 where these surfaces would otherwise come in contact.

To rigidly connect the stationary parts of the two power units and of the pump unit together three fixed columns are used, but for the sake of clearness only one of these 115 is shown on the drawing. These columns are made in two parts drawn together by right and left-handed nut 116. The whole apparatus is shown supported on two I-beams 117 and 118 which may be fastened to suitable foundations, or may be fixed between the walls of a well from which liquid is to be pumped.

In order to operate the valves of the power units it is necessary to derive a suitable motion from some part of the vertical reciprocating system and to transform the motion to a part such as a cam shaft 105 which revolves once during each complete cycle comprising two upward and two downward strokes. As the length of the strokes is variable within limits the device employed must permit such variations to occur without interfering with the proper operation of the cam shaft. Examples are given of gear suitable to effect the desired purpose. A mechanical device for this purpose is shown in detail in vertical section in Fig. 10 and in a sectional plan in Fig. 11. Attached to a reciprocating part such as side rod 99 are two arms or brackets 119 and 120 holding between them the swivel cam 121 which can oscillate about the ball bearings 122 and 122'. The cam 121 therefore participates in the vertical reciprocation of the moving parts. Attached to a stationary portion of the main apparatus is a fixed casting 123 which carries a bush 124 to which is attached two bearings 125 for carrying a pin 126, and on this latter is mounted roller 127. To the ends of this pin 126 are attached springs 128 and 128$^a$, and the opposite ends of these springs are attached to projections 129 and 130 fixed to a cylinder 131. The cylinder carries two cheeks 132 and 133 which have a sliding embrace on the cam 121 and which carry a pin 134 on which is mounted a roller 135. This roller is pressed by springs 128 and 128$^a$ against the cam surface 136 here shown as an inclined plane on the side of 121, but which may have a slightly curved shape. Sliding within cylinder 131 there is an inner cylinder 137 the shoulder on which is pressed against a stop 138 by means of a spring 139. The cylinder 137 carries a crank pin bearing 137', and the crank pin 137$^2$, crank 140 and shaft 141 which is carried in a bearing 142, furnish the rotary connection with the main casting 123. The shaft 141 is rigidly attached to the spur wheel 143 having twice the number of teeth as the spur wheel 144 with which it is in gear. The smaller spur wheel rotates upon a fixed pin 145 which is carried by the main casting 123 as shown. Attached to the lower face of the spur wheel 144 is a crank disk 146 provided with a crank pin 147, and between this crank and a fixed pin 148 there is a tension spring 149. Shown in Fig. 11 only there is a cam shaft 150 to which is fixed a spur wheel 151 in gear with spur wheel 143 and having twice the number of teeth of the latter.

The action of the gear just described is as follows:—On the commencement of a power stroke the roller 135 is pressed into contact with the upper part of the cam surface 136 by the spring 128, and as the swivel cam 121 moves upward with the reciprocating parts the roller 135 is forced to the left carrying with it cylinders 131 and 137 and causing the rotation of crank pin $137^2$, shaft 141 and the spur wheels 143, 144 and 151, thus revolving the cam shaft 150. As cylinder 131 moves to the left its lower surface which is made flat in order to slide on a similarly flattened surface on the top of casting 123 is pressed upon this casting by the inclined action of spring 128. While the rotating parts attached to shaft 141 are being accelerated there may be relative motion between cylinder 131 and 137, and the spring 139 may be somewhat compressed if the accelerating forces are large enough, and the means shown for transforming the motion from roller 135 to shaft 141 is intended to prevent undue strains coming upon the various parts and to allow for the effects of inertia of these parts. In Fig. 10 the parts are shown in the position they occupy at the completion of an upward stroke of normal length. When a downward stroke begins springs 128 and $128^a$ by keeping the roller 135 in contact with the surface 136 pull the cylinder 131 to the right and continue the rotation of crank pin $137^2$, shaft 141 and so through the spur wheels the cam shaft 150. The crank pin $137^2$ has on the completion of a downstroke made half a turn and is therefore on the right hand side of shaft 141. A second upstroke and a second down stroke give the crank pin $137^2$ two further half turns so that in four successive strokes the spur wheel 143 makes two complete revolutions and the cam shaft wheel 151 makes one complete revolution as required. In order that crank pin $137^2$ should not come to rest on a dead center the disk pin 147 attached to the loose spur wheel 144 is urged to the position shown nearest the fixed part 148 causing spur wheel 143 to move into such a position as to bring crank pin $137^2$ off the dead center. It will be observed that as the swivel cam 121 moves upward and downward it will oscillate in its bearings guided by cheeks 132 and 133 so that it is always in line with the center line of cylinder and of crank pin $137^2$. This arrangement dispenses with the necessity for any connecting rod between the bearing 138 and the cylinder 137 which may therefore be rigidly attached as shown. Having derived the necessary rotary motion for cam shaft 150 it is not necessary to explain further the action of the cams which operate the admission and exhaust valves in the power units since ordinary 4-cycle gas engines afford sufficient examples of suitable arrangements.

A pneumatically operated gearing for transforming the reciprocating motion of a part of the moving parts, such as rod 99 of Fig. 9, into a rotary motion of the cam shaft, 105 of Fig. 9 or 150 of Fig. 11, is shown in Figs. 12 and 13 which represent a vertical section and a sectional plan respectively. Fixed to the rod 99 by two saddle clips 152 and 153 are cams 154 and 155, the right hand surface of which forms a path for the cam roller 156 capable of rotating upon a pin 157, this pin being carried in bearings attached to a piston 158 which slides in a cylinder 159 which is fixed to an immovable part of the main apparatus. The spring 160 pressing against the stationary buttress 161 tends to keep the roller 156 pressed against the cam surfaces. The space 162 in the cylinder is connected by the passage 163 controlled by a needle valve 164 with a clearance space 165 behind piston 166 in cylinder 167. The bent rod 168 is pivotally connected by gudgeon pin 169 with the piston 166 and with a sliding sleeve 170. Spring 171 is under compression and being inclosed between the collar on the sleeve and the fixed buttress 172 tends to keep the sleeve and therefore piston 166 in its extreme left-hand position. The back of piston 166 and the casting 173 adjacent thereto are so shaped as to provide an annular space 174 which acts as a dashpot for bringing the piston 166 to rest at the end of its motion toward the left. The bent rod 168 has a projection 175 adapted to engage projections on the inner surface of a cam ring 176 and is pulled into recesses in the cam ring by spring 177. There are four recesses making corresponding projections at 90° apart in cam ring 176 which is keyed by the coupling 177 to the cam shaft 150.

The action of the apparatus is as follows:
On a power stroke, rod 99 moves upward, and toward the end of the stroke the cam 155 forces the roller 156 and the piston 158 to the right and compresses the air in the space 162. Compressed air passes through passage 163 controlled by needle valve 164, and then acting on piston 166 forces this piston and rod 168 to the right, thus turning the cam ring 176 through an angle of 90° and rotating the cam shaft 150 to the same extent. A downward movement of the rod 99 and cam 155 allows roller 156 and piston 158 to move to the left under the action of spring 160 and the air pressure being thus relieved upon the back of piston 166 this piston and the parts connected thereto are also moved to the left under the action of spring 171. When the movements to the left are completed the projection 175 is in the position to engage another projection of the cam ring 176. Toward the end of the down stroke the surface of cam 154 again presses roller 156 to the right, the action described above being repeated and the cam shaft 150 being turned through another 90°. In a similar manner a second upstroke and a second downstroke result in two further rotations of the cam shaft 150 each through 90° thus completing one revolution of the cam shaft as required for the control of the admission and exhaust valves of the 4-cycle power units. In order that the cam shaft 150 shall not over-run the required 90° of each movement there is provided a lever 178 carried on a fixed hinge 179 and fitted with a projecting pin 180 adapted to engage in one of four recesses such as that shown dotted at 180' on the surface of collar 180² which is rigidly keyed upon the cam shaft 150. The pin 180 is pressed upon the collar by means of the spring 181 the tension of which can be adjusted by nut 182 so that as soon as the collar revolves to bring a recess opposite the pin 180, the latter at once enters the recess and holds the collar and therefore the cam shaft from rotating further. This hold is overcome only when the compressed air acting on piston 166 exerts sufficient force to again turn the cam ring 176 and so cause the pin 180 to ride out of the recess against the action of spring 181. By properly adjusting the clearance space 162, as for example by altering the thickness of ring 183 in the compression space, by regulating the needle valve 164, the tension of springs 171, 177 and 181, it can be arranged that the cam shaft will rotate at the correct time and that the apparatus shall work smoothly.

It has been mentioned with regard to Fig. 1 and Fig. 9 that the piston rod of a power unit passes through an air-tight gland, and in Figs. 14 and 15 there is shown in elevation and plan respectively an improved form of packing which we have found efficient in making a gland tight against the leakage of air or other gas, and yet causing very little friction upon the piston rod. It consists of a ring casting 184 which is held in a recess in the cylinder cover, and is itself recessed to take a spring ring 185 turned to have an internal diameter smaller than the diameter of the piston rod and then cut to give beveled edges as shown. The recess in the cylinder cover to contain ring 184 should preferably be slightly larger than the latter so as to allow the ring to move laterally to adjust itself to slight errors of alinement of the piston rod. The ring 185 is sprung open sufficiently to embrace the rod upon which it presses inwardly. Inserted between the open ends of the ring is a wedge shaped piece 186 preferably made of softer material and so shaped as to fill up the space between the ends of the ring and to be pressed by the latter in such a manner that it tends to close against the rod. This arrangement secures that as the ring and wedge piece wear the latter wears more quickly and they automatically close in upon the rod and maintain a tight joint against it and against ring 184. Fig. 16 shows a similar arrangement in which the closing action due to the initial tension of the ring 185 is assisted by a number of springs, such as that shown at 187, which are compressed into recesses 188 prepared in the ring 184 and bearing against the outer edge of the ring 185 press it inwardly against the rod. In Figs. 17 and 18 are shown forms of packing rings for the pistons operating in the combustion cylinders of the power units and in which the new features are to be found in the piston rings made in two halves 189 and 190 turned to a greater diameter than that of the cylinder 191, against which they are desired to press to form a tight joint and spring into position in a recess formed in the piston. The free ends of the rings are cut at an angle as shown, and the ends of the one half 189 bear against the ends of the other half 190 so as to keep a tight joint. As the rings wear they expand under their initial tension and so maintain their contact with the inner surface of the cylinder 191. In Fig. 17 a number of springs such as 192 are shown inserted between the bottom of the recess which carries the piston ring and the two halves of the ring itself so arranged as to exert an outward pressure against the halves of the ring which pressure is transmitted through the rings to the inner surface of the cylinder.

Figure 20:
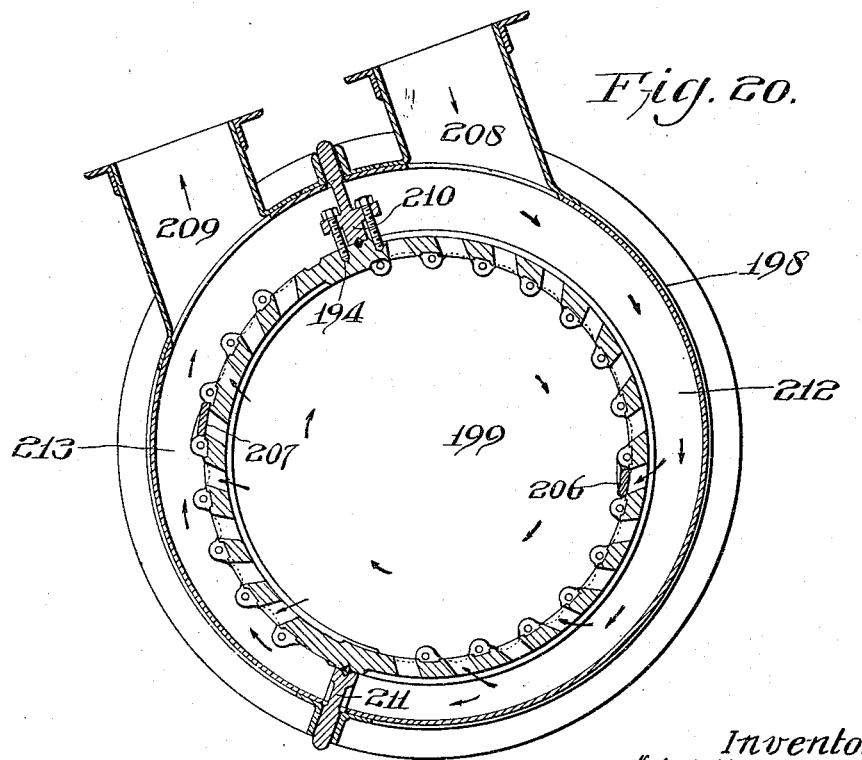
Fig. 20 is a sectional plan of same.

It now remains to describe the pump unit shown in the lower portion of Fig. 9 and in greater detail in Figs. 19 and 20 which give a sectional elevation and plan respectively. The pump piston 95 reciprocates within a cylinder 193 which forms a liner in a cylindrical casting 194. This casting also forms in its upper part a large air vessel containing an air space 195 connected by passage 196 with a further air space 197 contained in a circular tank chamber 198. The lower part of casting 194 is enlarged in the manner shown and forms the valve box 199. Separating the valve box from the space 200 into which piston 95 projects on its downward stroke, there may be a flexible diaphragm 201 clamped between casting 194 and angle iron ring 202. To prevent the diaphragm falling too low there may be one or more arresting bars such as 203 to limit the downward movement of the diaphragm. The space 200 is filled with clean liquid and the use of the diaphragm, which may be made of such material as strong filter cloth, is to prevent any dirty liquid pumped through the valve box from bringing suspended material into contact with the wearing surfaces of piston 95 and liner 193. Clean liquid may also be filled in above the piston 95 up to, say, the level of the bottom of the projecting conical casting 204, the use of which is to retain the air in the space of which 195 and prevent air from leaking upward around the rod 205 which connects to the power unit. Vertical hinged flap valves are fitted around the circumference of the valve box and one inlet valve 206 is shown on the right hand side of the valve box both in Figs. 19 and 20 and one delivery valve 207 is shown at the left hand side, the remainder being omitted. Tank 198 is provided with an inlet for liquid 208 and an outlet for liquid 209, and vertical partitions 210 and 211 are so arranged as to divide the space in tank 198 outside of the casting 194, into two spaces 212 and 213 respectively. Liquid entering at 208 flows to the right in the space 212 which gradually converges from the partition 210 toward the partition 211, feeding all the inlet valves, the passages to which are so shaped as to give good lines of flow and the minimum change of velocity or direction. On the other hand liquid which passes outwardly through the delivery valves 207 situated on the left between partitions 210 and 211 is received in a diverging passage 213 until it arrives at the outlet 209. Here also the lines of flow are made good, and owing to the direction of the passages leading up to the individual valves the stream lines are such as to produce inside the valve box 199 a vortex flow. The arrows indicate the approximate stream lines. This design in which very large air spaces are provided in immediate proximity to all the valves, in which the passages for the flow of liquid are made so that there is a minimum loss in fluid friction, and in which very ample valve surface is provided, constitutes an improvement which results in more efficient working and allows the apparatus to work at the maximum speed of operation. Further the arrangement is such that on an upstroke of piston 95 not only is liquid taken in through the inlet 208 and the valves such as 206, but owing to the pressure produced in air vessels 195 and 197 which communicate through passage 196, liquid is delivered under pressure through the outlet 209. Thus practically all the work is done on the upstroke. On the following downstroke liquid is transferred from within valve box 199 through the delivery valves such as 207 into the outer tank 198, but as the pressure on both sides of the delivery valves is practically the same this transference is not accompanied by the performance of external work. In order that no air shall accumulate in the space below piston 95 a small pipe, preferably fitted with a non-return valve, may be provided to conduct away any air and such a pipe is shown fitted in Figs. 9 and 19.

It frequently happens that liquid containing solid matter, such for example as sewage, has to be pumped and in such case pieces of solid material such as wood or other hard substances may get caught between a valve and its seat when the valve shuts, and so cause strain upon the valves and their spindles and give rise to troubles. To overcome such difficulties we have constructed a valve of the hinge type which is not injured by the trapping of hard substances between the valve and its seat, but which gives way between its integral parts under such conditions, and after the hard substance has been swept away on the next stroke will again resume its normal arrangement of parts.

In Figs. 21 and 22 an arrangement is shown in diagrammatic form in which the incoming air or combustible mixture is given a rotary motion and the exhaust is arranged centrally and mechanically operated. The arrangement is shown in connection with the combustion chamber of a 2-cycle pump corresponding to that illustrated in Fig. 1. The chief difference consists in that in Fig. 22 there is an exhaust valve 257 fitted in the bottom of the combustion cylinder through which the exhaust gases leave and that only one set of transfer ports 258 is required in the walls of the cylinder. The construction of these ports is shown in section in Fig. 21 and it will be observed that the air or combustible mixture compressed into the space 5 surrounding the cylinder by the upward motion of piston 7 reënters the combustion chamber when piston 7 rises beyond the lower edge of ports 258 and flows in with a tangential motion, thus producing a free vortex which tends to keep the cold incoming gases separate from the heated exhaust gases and to sweep the latter past exhaust valve 257 with the minimum of mixing. As shown in the drawing there is one valve 6 for gas and one valve 6$^a$ for air so that the apparatus may work with a gaseous combustible mixture, but if it is desired to work with liquid fuel then the liquid spray can be introduced into the combustion chamber at a point close to the exhaust valve. In the latter case air only would be drawn into the space above the piston and forced into the combustion chamber to displace the burnt products.

In Fig. 22 there is indicated an arrangement for opening the exhaust valve 257 by means of a cam piece 259 attached to a reciprocating part and operating the exhaust valve through a bell crank 260, so that the valve 257 is opened before port 258 is open to the combustion chamber by the piston. Exhaust gases escape and so reduce the pressure in the combustion chamber before the fresh combustible charge enters.

What we claim is:—

1. The combination of a vertical power cylinder, a power piston operating therein, work absorbing elements connected therewith adapted to acquire momentum on the power stroke of the piston and operating by gravity to cause the return stroke of the piston, and means for utilizing elastic cushions by compressing the same when starting the apparatus from rest, or on decreased external work resistance, or when greater energy is generated on combustion, or when for other reasons, the length of stroke increases, said cushions not compressed when the apparatus is working normally.

2. The combination of a vertical power cylinder, a power piston operating therein, work absorbing elements connected therewith adapted to acquire momentum on the power stroke of the piston and operating by gravity to cause the return stroke of the piston, means for injecting fuel into the power cylinder by quick impulses caused by the movement of the reciprocating masses comprising a diaphragm in contact with liquid fuel and means for impacting the diaphragm.

3. The combination of a vertical power cylinder, a power piston operating therein, work absorbing elements connected therewith adapted to acquire momentum on the power stroke of the piston and operating by gravity to cause the return stroke of the piston, means for injecting fuel into the power cylinder by quick impulses caused by the movement of the reciprocating masses, comprising a flexible diaphragm in contact with liquid fuel and means for impacting the diaphragm.

4. The combination of a vertical power cylinder, a power piston operating therein, work absorbing elements connected therewith adapted to acquire momentum on the power stroke of the piston and operating by gravity to cause the return stroke of the piston, and automatic means for controlling the introduction of expansive charges operating relatively to the length of the stroke.

5. The combination of a vertical power cylinder, a power piston operating therein, work absorbing elements connected therewith adapted to acquire momentum on the power stroke of the piston and operating by gravity to cause the return stroke of the piston, and automatic means for modifying the amount of the expansive charge introduced operating relatively to the length of an abnormal stroke.

6. The combination of a vertical power cylinder, a power piston operating therein, work absorbing elements connected therewith adapted to acquire momentum on the power stroke of the piston and operating by gravity to cause the return stroke of the piston, and pneumatically operated means for modifying the amount of the expansive charge introduced operating relatively to the length of an abnormal stroke.

7. The combination of a vertical power cylinder, a power piston operating therein, work absorbing elements connected therewith adapted to acquire momentum on the power stroke of the piston and operating by gravity to cause the return stroke of the piston, pneumatically operated means for modifying the amount of the expansive charge introduced operating relatively to the length of an abnormal stroke, and adjustable valve controlled means for restoring the modifying means.

HERBERT ALFRED HUMPHREY.
WILLIAM JOSEPH RUSDELL.

Witnesses:
JOSEPH MILLARD,
WALTER J. SKERTEN.